United States Patent [19]

Mayhew, Jr.

[11] 4,377,274

[45] Mar. 22, 1983

[54] KNIFE GATE VALVE

[76] Inventor: John D. Mayhew, Jr., 3633 Poplar Drive, SW., Roanoke, Va. 24018

[21] Appl. No.: 205,492

[22] Filed: Nov. 10, 1980

[51] Int. Cl.³ .............................................. F16K 3/02
[52] U.S. Cl. .................................... 251/327; 251/328; 251/368; 251/266
[58] Field of Search ....................... 251/327, 328, 266; 137/454.2, 329.01

[56] References Cited

U.S. PATENT DOCUMENTS

| | | | |
|---|---|---|---|
| 2,893,684 | 7/1959 | Williams et al. | 251/328 |
| 2,942,841 | 6/1960 | Stillwagon | 251/214 |
| 3,033,517 | 5/1962 | Rovang et al. | 251/214 |
| 3,333,816 | 8/1967 | Williams et al. | 251/327 |
| 3,350,058 | 10/1967 | Alden | 251/329 |
| 3,353,784 | 11/1967 | Grove | 251/328 X |
| 3,945,606 | 3/1976 | McDonald | 251/326 |
| 3,993,092 | 11/1976 | Still | 137/454.2 |
| 4,009,727 | 3/1977 | Bailey | 137/454.2 |
| 4,201,365 | 5/1980 | Paptzun et al. | 251/328 |
| 4,221,307 | 9/1980 | Peterson | 251/327 X |

OTHER PUBLICATIONS

Advertisement: McAvity: Fabricated Stainless Steel Knife Gate Valve.
Advertisement: FABRI—VALVE; Fig. 105 Wafer Knife Gate Valve.
Advertisement: Hercules Technical Report: 1900 Engineering Information UHMW Polymer, M—239A.
Advertisement: FABRI—VALVE: The World's Two Greatest Knife Gates? You Don't Know the Half of It.
Advertisement: Josam—Wey: Knife Gate Valves.
Advertisement: L&M Valve Company, 3633 Poplar Drive, S.W.
"Fabri—Valve" advertisement, FORM 43-C-4-76, A Dillingham Company, P.O. Box 4367, Portland, OR 97208.

Primary Examiner—Arnold Rosenthal
Attorney, Agent, or Firm—Griffin, Branigan & Butler

[57] ABSTRACT

A knife gate valve (10) comprises an elongated, relatively-flat rigid frame (16) having two rigid side plates (24 and 26) being spaced from one another. A relatively-resilient valve liner (14), forming a valve seat about a liquid flow passage (22) through the frame (16) is insertable into the frame (16) from a first end of the frame so that the liner (14) can be replaced without detaching the gate valve from a fluid system with which it is used. The valve liner (14) has a slot (45) extending into the valve liner from the first end for receiving a gate blade (12). In the preferred embodiment, rigid shields (32) are attached to the frame side plates (24 and 26) about the liquid passage (22) and extend into the liquid passage (22) beyond outer side faces of the liner (14). The liner is made in the form of three inserts which can be positioned within a cavity (31) formed by the shield and frame from the first end.

14 Claims, 3 Drawing Figures

KNIFE GATE VALVE

BACKGROUND OF THE INVENTION

Knife gate valves were originally designed to be used in paper-pulp flow systems, with the gates thereof having sharp blades at the lower ends to cut through the pulp. However, since their first introduction, the use of knife gate valves has extended into many other fields. In this respect, knife gate valves are commonly used to control the flow of coal slurry, sewage, water, vacuums, chemicals, and the like.

A problem with prior-art knife gate valves is that it is expensive and cumbersome to make them "bubble-tight" (so that there is virtually no water seepage therethrough). For this reason, where there has been no necessity that such valves be "bubble-tight", they have not been. Applications which do not require "bubble-tightness" include coal slurry and sewage applications. Similarly, even where "bubble-tightness" has been required, gate valves have normally been made so that they provide such sealing for flows in only one direction. In such systems, back surges provide seepage through most prior-art knife gate valves, even those which are "bubble tight".

In order to provide "general-application" knife-gate valves, it has been common practice for some manufacturers to manufacture knife gate valves which do not have "bubble-tight" seals, but on which "bubble-tight" seals can be installed. However, in such a case, the seal is often placed in the liquid flow passage of the valve, and therefore cuts down on the passage cross-sectional area.

Further, a problem that is associated with lack of "bubble-tightness" on the upstream side of a knife-gate valve is that sewage, chemicals, or the like that is being controlled by the valve can often flow up along the blade of the valve, and into the valve mechanisms, thereby caking, corroding or otherwise interferring with these mechanisms and making the valve difficult to open and close.

It is therefore an object of this invention to provide a gate valve which provides a "bubble-tight" seal for knife gate valves for flows in both directions.

Similarly, it is an object of this invention to provide a gate valve in which liquid that is being controlled by the valve is essentially prevented from passing along the valve's blade to mechanisms for opening and closing the valve.

Along with the preceding two objects, it is also an object of this invention to provide a gate valve which provides a "bubble-tight" seal without reducing the cross-sectional area of a liquid flow passage.

It has been common practice in the prior-art to provide a gate-blade actuator for knife gate valves which includes an external wheel threaded onto a screw attached to the gate blade. The wheel is held against axial movement. When the wheel is rotated the screw is caused to move axially in the wheel and thereby move the gate blade upwardly and downwardly. Such a mechanism in which the screw moves upwardly and downwardly is termed in this application a "rising" mechanism. In such a mechanism packing around the gate blade prevents flow of liquid up to the screw mechanism. However, such an arrangement is sometimes inconvenient because the moving screw is cumbersome. Thus, it is an object of this invention to provide a knife gate valve having a gate blade drive mechanism of the "non-rising" type in which a threaded screw does not move up and down when the valve is being opened and closed.

In many applications of knife gate valves, the gate valves only have a life that is measured in months. For example, in coal slurry applications many valves must be totally removed from pipe systems and replaced after only four months of operation. Since these valves cost in the hundreds of dollars and are quite heavy, their frequent replacement is expensive and time consuming. Some knife gate valves have been produced which have removable liners held in frames in which gate blades move up and down. However, in these systems the gate-valve frames must be removed from, or at least significantly loosened from pipe systems to which they are connected to replace the liners. This is also expensive.

It is therefore an object of this invention to provide a gate valve having a liner which can be periodically replaced, without removing a valve frame from the pipe system to which the valve frame is connected.

Similarly, it is an object of the invention to provide a gate valve having a life span which is considerably longer than prior-art gate valves.

It is yet another object of this invention to provide a gate valve which is relatively inexpensive to manufacture, but which is universal in application, since it can be beneficially used in both cases where "bubble-tight" seals are and are not required.

Further, it is an object of this invention to provide a gate valve in which the direction in which the valve is installed is not important, since the valve provides a "bubble-tight" seal in both directions.

It is a further object of this invention to provide a gate valve which operates relatively easily over an extended period of use.

In addition, it is an object of this invention to provide a knife gate valve whose liner, and valve seat are fully protected by metallic shields against impact from hard objects (such as coal) passing through the valves.

It is still another object of this invention to provide a gate valve whose liner can be constructed in the field by a mechanic, when necessary.

SUMMARY

According to principles of this invention, a gate valve comprises a frame and a liner which can be installed into, and removed from the frame from the end thereof at which a gate blade is driven. The gate blade rides in the liner. The liner is comprised of three inserts (two side inserts and a U-shaped spacer insert). By making the liner of three inserts, it can be installed around, and protected by, shields which extend into a fluid-flow passage in the frame. This valve can be made with a non-rising blade drive mechanism in which a threaded-screw follower is encased inside a housing formed by the frame, and the threaded screw passes through the housing at a packing gland.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in clear manner.

DESCRIPTION OF THE PREFERRED EMBODIMENTS

Figure 1:
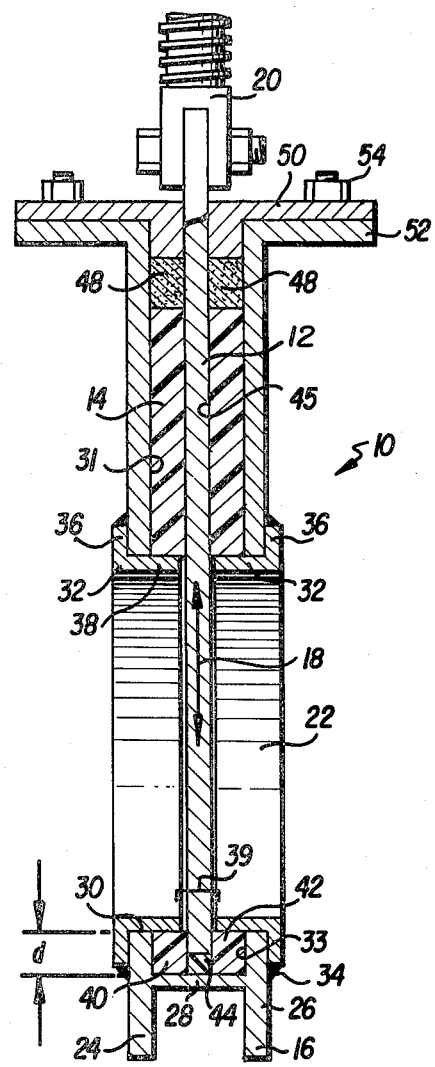
FIG. 1 is a side-sectional view of a knife gate valve according to principles of this invention with a "rising" type valve-operating mechanism.

Describing the FIG. 1 embodiment, a knife gate valve 10 basically comprises a gate blade 12, a liner 14, and a frame 16. In overall operation, the gate blade 12 is moved upwardly and downwardly in the direction shown by arrows 18 by a driving screw 20 to respectively cover, and uncover, a flow passage 22 through both the frame 16 and the liner 14.

Describing the above mentioned main elements in more detail, and also describing supporting elements, the frame 16 is constructed of forged steel or cast iron. For a six inch size valve the frame 16 is basically formed of two half-inch thick side plates 24 and 26 and a sheet metal spacer 28 which is welded to the side plates 24. The spacer 28 has a horseshoe shape when viewed from the side, resembling in shape the insert element 44 (FIG. 2)—the insert element 44 (which is not the spacer) will be described in more detail below.

It should be noted that the spacer 28 is spaced a distance d from edges 30 of the flow passage 22 in the side plates 24 and 26. This is true about the peripheries of the edges 30, with the exception of the top of the flow passage 22 about which the spacer 28 does not extend. That is, the horseshoe-shaped spacer 28 is open at the top, as viewed in FIG. 1. The spacer 28 holds the side plates 24 and 26 a fixed space (1¼ inches for a 6 inch valve) distance apart, thereby forming a liner cavity 31 between the side plates 24 and 26 and the spacer 28.

The frame side plates 24 and 26 have welded at the lateral-passage edges 30 circular shields 32 by a weld bead 34. The shields 32 are made of stainless steel and extend about the peripheries of the edges 30. In cross-section, the shields 32 are L-shaped so that flanges 36 thereof cover outside faces of the side plates 24 and 26 and other flanges 38 extend into the flow passage 22. In this respect, the flanges 38 of the two shields 32 extend toward one another, however, they leave a gap 39 therebetween. However, it should be noted that the shields 32 extend beyond the interior sides 33 of the side plates 24 and 26 and that the shields 32, the side plates 24 and 26, and the spacer 28 define a cavity 40 in which a portion of the liner 14 is mounted.

With regard to the liner 14, this assembly, in the preferred embodiment, is actually constructed of three separate elements. All of these elements are made of a polyethylene thermoplastic having a molecular weight of 2 to 6 million. A particular product which works well for the liner is a high-density polyethylene sold under the trademark 1900 UHMW polymer by Hercules, Incorporated of Wilmington, Del. In any event, the liner 14 comprises first and second side inserts 40 and 42 and a spacer insert 44. The liner side inserts 40 and 42 include corresponding holes 46 therein and the liner spacer insert 44 is horseshoe shaped, being open at the top when the liner 14 is installed in the frame 16 of FIG. 1. FIG. 1 depicts the liner 14 installed in the frame 16, with the liner side inserts 40 and 42 being seated around flanges 38 of the shields 32 which extend into the flow passage 22. The liner spacer insert 44 is between the liner side inserts 40 and 42. Thus, the liner side inserts 40 and 42, and the liner spacer insert 44 form a gate-block slot 45 (which is filled with the gate blade 12 in FIG. 1), and which is open at the top of the liner 14, as is depicted in FIG. 1.

It will be appreciated that the gate blade 12 can be moved up and down within the gate-blade slot 45 by the driving screw 20 of a "rising" type valve-actuating mechanism. The gate blade 12 is constructed of stainless steel.

Wax packing 48 is installed above the liner inserts 40, 42 and 44 between the frame side plates 24 and 26 and the gate blade 12. For the "rising" type valve-actuating mechanism of FIG. 1, this packing is held in position by a packing follower 50 which is bolted to a flange 52 of the frame 16. The packing 48 prevents the flow of any small amount of fluid which reaches the packing 48 around the blade 12.

With regard to fluid flow, both the liner spacer insert 44 and the gate blade 12 are one-half inch thick for a six inch valve (for other size valves the spacer insert 44 and the gate blade 12 are not necessarily one-half inch thick, but they are the same thickness). Thus, the liner side inserts 40 and 42 are in tight contact with the gate blade 12. Because of this tight contact, the liner side inserts 40 and 42 provide valve seats for the blade gate 12 for fluid flow in either direction through the flow passage 22. In this respect, the material of the liner 14 is sufficiently resilient that a tight fit between the gate blade 12 and the liner side inserts 40 and 42 is provided to seal the flow of fluid between the blade and the liner side inserts 40 and 42. This is accomplished even though the plastic-to-metal interface allows the blade member 12 to be relatively easy to move upwardly and downwardly in the slot 45 formed in the liner 14.

In operation of the knife gate valve of FIG. 1, this valve is installed in a fluid line, with flanges 36 of shields 32 being abutted against flanges of pipes (with a gasket therebetween) and fastened thereto so as to control the flow of fluid between the pipes on opposite sides of the knife gate valve 10. The gate blade 12 is thereafter raised and lowered by the "rising"-type driving screw 20 to control such flow. Tests have shown this valve to be less susceptible to corrosion and abrasion than most prior-art knife valves (because the frame is fully protected by the stainless steel shields 32 and the plastic liner 14) and this knife valve should, therefore, require less maintenance than most knife gate valves. However, when corrosion and abrasion does affect the knife gate valve of this invention, it will first affect the liner inserts 40, 42 and 44 at locations where the gate blade 12 is seated between the side inserts 40 and 42 of the liner 14. Once such corrosion and abrasion has reached excessive limits, maintenance is required. In this respect, however, it is not necessary to detach the knife gate valve frame 16 from the pipe line (either to throw it away, or to replace its liner) as was necessary by most prior-art devices. Instead, one removes the packing follower 50 by disengaging bolts 54 and removes the gate blade 12. Thereafter, the packing 48 is removed and, the spacer insert 44 of the liner 14 is removed. In this respect, the gap 39 between the shields 32 is greater than one-half inch so that the spacer insert 44 can be removed. The side inserts 40 and 42 are each ¼ inch thick. Each of these inserts can therefore be shifted sideways and then removed through the gap 39 between the shields 32. To install a new liner, new side inserts are inserted through the gap 39 between the shields 32 and each is shifted laterally to an opposite side to be seated against the frame side plates 24 and 26 and held in place by the shield flanges 38. Finally, a new liner spacer 44 is inserted between the side inserts 40 and 42. The new spacer insert 44 can be driven downwardly by a gate blade 12, if necessary.

Thereafter, new packing 48 is positioned above the liner 14 between the frame side plates 24 and 26 and the gate blade 12. The packing follower 50 is then rebolted to the flange 52 of the frame. The knife gate valve 10 is thereafter ready for use without having removed the knife gate valve from the line.

It should be appreciated by those skilled in the art that the knife gate valve of FIG. 1 provides a "bubble-tight" seal in both directions. Further, by providing such a seal in both directions, there is no significant field backup between the gate blade 12 and the frame which makes operation of the gate blade 12 difficult. Still further, the plastic/stainless steel interface between the liner 14 and the gate blade 12 provides a good sliding surface to make operation of the gate blade 12 relatively easy.

Figure 3:
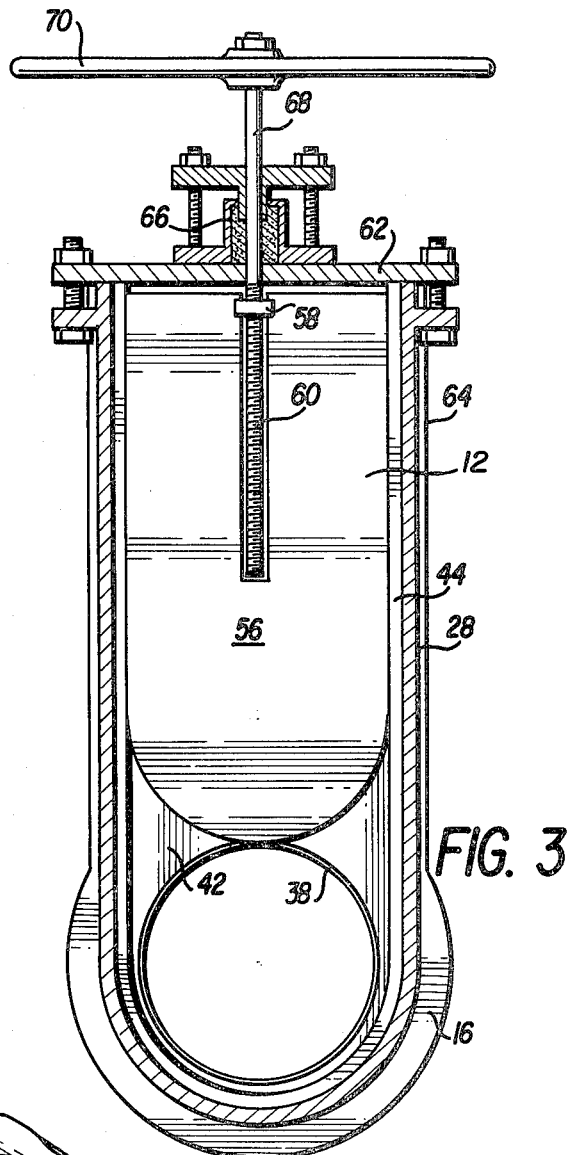
FIG. 3 is a front, partially cut-away, view of a second embodiment knife gate valve of this invention which employs a "non-rising" type valve-operating mechanism.
Figure 2:
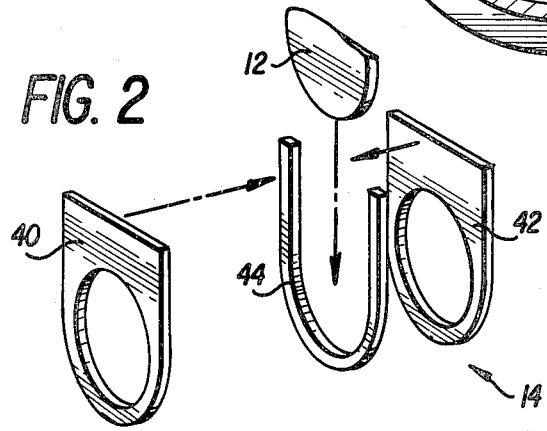
FIG. 2 is an exploded view of a liner which is employed with the knife gate valve of FIG. 1.

FIG. 3 depicts a knife gate valve arrangement made possible by the insert arrangement of FIG. 1 which prevents fluid residue backup into the working mechanisms of a knife gate valve. In this respect, FIG. 3 depicts a "non-rising" knife gate valve drive mechanism in which a blade 56 is rigidly attached to a follower nut 58. A threaded shaft 60 engages the threads of the follower nut 58 on the inside of a valve cover 62. That is, the engaging mechanism between a follower nut 58 and the screw 60 are enclosed with the blade 56 by a frame 64 and the cover 62. Of course, the liner insert assembly as is depicted in FIG. 2, is also positioned between the members of frame 64 and the blade 56. In the embodiment of FIG. 3 a packing gland 66 surrounds the external portion 68 of the threaded shaft 60. A wheel 70 is fixedly attached to the external portion 68 so that the wheel 70 can be used to rotate the threaded shaft 60. The threaded shaft 60 does not move axially, being keyed to the frame 64. However, as the threaded shaft 60 is rotated, the follower nut 58 rides axially on the threaded shaft 60 to move the gate blade 56 into blocking, and unblocking positions.

The arrangement of FIG. 3 is possible because the gate valve of this invention does not allow an undue amount of solid materials in fluid flow to reach the follower nut 58, and therefore the follower nut 58 and the gate blade 56 do not become "jammed" with extraneous matter as do the mechanisms, and blades, of many prior-art knife gate valves.

The gate blade drive mechanism of the FIG. 3 embodiment is especially useful in that it does not have a threaded screw external of the valve which is moving upwardly and downwardly. The structure of this knife gate valve is compact and streamlined.

It can be appreciated by those skilled in the art that the knife gate valve that I have disclosed herein has many extremely important advantages over prior-art gate valves. It is more economical to operate, and in many respects it is easier to build than some prior-art valves. Further, it requires less maintenance and has an extended, lifetime.

While the invention has been particularly shown and described with reference to preferred embodiments, it will be understood by those skilled in the art that various changes in form and detail may be made therein without departing from the spirit and scope of the invention.

For example, the dimensions of the various described parts could be completely different for different size valves, although their proportions would probably be similar to those described herein.

The embodiments of the invention in which an exclusive property or privilege are claimed are defined as follows:

1. A gate valve comprising:
   an elongated, rigid, valve frame having first and second ends, said valve frame comprising two rigid plates and spacing means extending between said two rigid plates for spacing said rigid plates a fixed space one from another, said two rigid plates defining aligned holes extending laterally therethrough for forming a fluid passage through said valve frame, said spacing means being positioned between said plates about said fluid passage, but being spaced from said fluid passage, and not being positioned directly on a first-end side of said fluid passage to thereby leave a free slot from said first end to said fluid passage;
   a relatively-resilient valve liner means of a size and shape for selective insertion thereof into said frame, between said rigid plates, from said first end, said relatively-resilient valve liner means comprising two side inserts, with a spacer insert positioned therebetween for defining a slot extending into said liner from said first end, said liner means defining a hole communicating with said slot extending laterally therethrough for forming a fluid passage to coincide with the fluid passage of said frame when said liner means is mounted in said frame, said liner means being seated between said frame plates around the periphery of said fluid passages;
   a gate blade for extending into said liner-means slot from said first end for moving into, and out of, a blocking position for fluid passing through said coinciding fluid passages of said frame and said liner means; and
   a drive means positioned at said first end linked to said gate blade for moving said gate blade in said slot.

2. A gate valve as in claim 1 wherein said rigid plates and spacing means of said frame are made of metal.

3. A gate valve as in claim 2 wherein said valve-liner means is made of plastic.

4. A gate valve as in claim 1 wherein is further included shields rigidly attached to said metallic plates and extending from external faces of said plates through said plate aligned holes into said spacing between said plates so as to each cover a portion of said valve liner means, but so as to leave a space between the shields of said two rigid plates.

5. A gate valve as in claim 4 wherein said liner means is constructed of a plurality of separate insert members.

6. A gate valve as in claim 5 wherein said two side inserts are each formed of a separate insert member and said central spacer insert is formed of a separate insert member.

7. A gate valve as in claim 6 wherein the two side insert members each have a side peripheral shape similar to the shape of the gate blade, although they are bigger and have holes therethrough which coincide with the aligned holes of the two rigid plates, and wherein the central spacer insert member is positioned between the two side insert members and has a generally U-shape.

8. A gate valve as in claim 1 wherein a valve cover is attached to said frame at said first end to prevent said valve liner means from being removed from said frame, said valve cover and said two rigid plates forming an enclosure in which said liner is located and in which said gate valve moves into and out of a blocking position.

9. A gate valve as in claim 8 wherein said liner means is constructed of a plurality of separate insert members.

10. A gate valve as in claim 9 wherein said two side inserts are each formed of a separate insert member and said central spacer insert is formed of a separate insert member.

11. A gate valve as in claim 10 wherein the two side insert members each have a side peripheral shape similar to the shape of the gate blade, although they are bigger and have holes therethrough which coincide with the aligned holes of the two rigid plates and wherein the central spacer insert member is positioned between the two side insert members and has a generally U-shape.

12. A gate valve including an elongated frame having first and second ends, said elongated frame having holes passing laterally therethrough for forming a fluid passage through said valve frame, said valve frame further defining a hollow slot extending from said first end through said elongated frame to said fluid passage;
   a gate blade in said slot for moving into, and out of, a blocking position for fluid passing through said fluid passage; and
   a gate blade liner means of a size and shape for selective insertion thereof into said hollow slot and for forming a channel in which said gate blade is moved into and out of said blocking position and for forming a seal between said gate blade and said frame to prevent fluid from flowing between these members, said liner being constructed of two separate side insert members and a separate central spacer insert member, said side insert members and said separate central spacer insert member being constructed of a single material.

13. A gate valve as in claim 12 wherein the two side insert members each have a side peripheral shape similar to the shape of the gate blade, although they are bigger and have holes therethrough which coincide with the aligned holes of the two rigid plates and wherein the central spacer insert member is positioned between the two side insert members and has a generally U-shape.

14. A gate valve as in claim 12 wherein said single material of which said liner is made is polyethylene thermoplastic having a molecular weight of from 2 to 6 million.

* * * * *

UNITED STATES PATENT AND TRADEMARK OFFICE
CERTIFICATE OF CORRECTION

PATENT NO. : 4,377,274
DATED : March 22, 1983
INVENTOR(S) : John D. Mayhew, Jr.

It is certified that error appears in the above—identified patent and that said Letters Patent is hereby corrected as shown below:

Col. 4, line 6, change "gate-block" to -- gate-blade --.

Signed and Sealed this

Tenth Day of May 1983

[SEAL]

Attest:

GERALD J. MOSSINGHOFF

Attesting Officer      Commissioner of Patents and Trademarks